United States Patent
Boon et al.

(10) Patent No.: US 11,799,972 B2
(45) Date of Patent: Oct. 24, 2023

(54) SESSION MANAGEMENT IN A FORWARDING PLANE

(71) Applicant: Cisco Technology, Inc., San Jose, CA (US)

(72) Inventors: Gary Kenneth Boon, Manotick (CA); King Tung Ma, Andover, MA (US); Vijayabhaskar Katamreddy, Hopkinton, MA (US); David Alan Johnson, Hollis, NH (US); David John Poirier, Arlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/935,801

(22) Filed: Sep. 27, 2022

(65) Prior Publication Data
US 2023/0013640 A1   Jan. 19, 2023

Related U.S. Application Data

(63) Continuation of application No. 17/109,875, filed on Dec. 2, 2020, now Pat. No. 11,483,398, which is a
(Continued)

(51) Int. Cl.
*H04L 67/148* (2022.01)
*H04L 67/563* (2022.01)

(52) U.S. Cl.
CPC .......... *H04L 67/148* (2013.01); *H04L 67/563* (2022.05)

(58) Field of Classification Search
CPC .......................... H04L 67/148; H04L 67/2814
(Continued)

(56) References Cited

U.S. PATENT DOCUMENTS

| 4,236,068 A | 11/1980 | Walton |
| 5,642,303 A | 6/1997 | Small et al. |

(Continued)

FOREIGN PATENT DOCUMENTS

| WO | 2013020126 A1 | 2/2013 |
| WO | 2014098556 | 6/2014 |
| WO | 2018009340 A1 | 1/2018 |

OTHER PUBLICATIONS

"I Love WiFi, The difference between L2 and L3 Roaming Events," Apr. 1, 2010, 6 pages.
(Continued)

*Primary Examiner* — Glenford J Madamba
(74) *Attorney, Agent, or Firm* — Polsinelli

(57) ABSTRACT

Systems, methods, and computer-readable media for offloading session management processing into a forwarding plane. In some examples, a subscriber is coupled to a network endpoint through a session manager during a network session of the subscriber in a network environment. A session manager offloading system of the session manager can be maintained in a vector packet processing system in a forwarding plane of the network environment. The session manager offloading system can be configured to offload processing from the session manager into the forwarding plane. Further, at least a portion of subscriber traffic in a stream between the subscriber and the network endpoint through the session manager can be intercepted. Subsequently, the at least the portion of the subscribed traffic that is intercepted can be processed at the session manager offloading system as part of offloading the processing from the session manager into the forwarding plane.

18 Claims, 10 Drawing Sheets

Related U.S. Application Data continuation of application No. 16/030,665, filed on Jul. 9, 2018, now Pat. No. 10,873,636.

(58) Field of Classification Search
USPC .......................................................... 370/325
See application file for complete search history.

(56) References Cited

U.S. PATENT DOCUMENTS

| | | | |
|---|---|---|---|
| 5,751,223 | A | 5/1998 | Turner |
| 6,812,824 | B1 | 11/2004 | Goldinger et al. |
| D552,603 | S | 10/2007 | Tierney |
| 7,573,862 | B2 | 8/2009 | Chambers et al. |
| D637,569 | S | 5/2011 | Desai et al. |
| 7,975,262 | B2 | 7/2011 | Cozmei |
| 8,010,079 | B2 | 8/2011 | Mia et al. |
| 8,102,814 | B2 | 1/2012 | Rahman et al. |
| 8,260,320 | B2 | 9/2012 | Herz |
| 8,284,748 | B2 | 10/2012 | Borghei |
| 8,300,594 | B1 | 10/2012 | Bernier et al. |
| 8,325,626 | B2 | 12/2012 | Tóth et al. |
| 8,396,485 | B2 | 3/2013 | Grainger et al. |
| 8,446,899 | B2 | 5/2013 | Lei et al. |
| 8,458,184 | B2 | 6/2013 | Dorogusker et al. |
| D691,636 | S | 10/2013 | Bunton |
| 8,549,638 | B2 | 10/2013 | Aziz |
| 8,612,612 | B1* | 12/2013 | Dukes .................. H04L 67/141 709/203 |
| 8,644,301 | B2 | 2/2014 | Tamhankar et al. |
| 8,650,279 | B2 | 2/2014 | Mehta et al. |
| 8,669,902 | B2 | 3/2014 | Pandey et al. |
| 8,675,488 | B1* | 3/2014 | Sidebottom ........... H04L 67/141 370/235 |
| 8,676,182 | B2 | 3/2014 | Bell et al. |
| 8,682,279 | B2 | 3/2014 | Rudolf et al. |
| 8,693,367 | B2 | 4/2014 | Chowdhury et al. |
| 8,718,644 | B2 | 5/2014 | Thomas et al. |
| 8,768,389 | B2 | 7/2014 | Nenner et al. |
| 8,849,283 | B2 | 9/2014 | Rudolf et al. |
| 8,909,698 | B2 | 12/2014 | Parmar et al. |
| 8,958,318 | B1 | 2/2015 | Hastwell et al. |
| 9,060,352 | B2 | 6/2015 | Chan et al. |
| 9,100,236 | B1 | 8/2015 | Shetty et al. |
| 9,130,859 | B1 | 9/2015 | Knappe |
| 9,173,084 | B1 | 10/2015 | Foskett |
| 9,173,158 | B2 | 10/2015 | Varma |
| D744,464 | S | 12/2015 | Snyder et al. |
| 9,251,535 | B1* | 2/2016 | Krishna ................. G06Q 30/06 |
| D757,424 | S | 5/2016 | Phillips et al. |
| D759,639 | S | 6/2016 | Moon et al. |
| 9,389,992 | B2 | 7/2016 | Gataullin et al. |
| 9,426,305 | B2 | 8/2016 | De Foy et al. |
| D767,548 | S | 9/2016 | Snyder et al. |
| D776,634 | S | 1/2017 | Lee et al. |
| 9,544,337 | B2 | 1/2017 | Eswara et al. |
| 9,609,504 | B2 | 3/2017 | Karlqvist et al. |
| 9,642,167 | B1 | 5/2017 | Snyder et al. |
| 9,654,344 | B2 | 5/2017 | Chan et al. |
| 9,713,114 | B2 | 7/2017 | Yu |
| 9,772,927 | B2 | 9/2017 | Gounares et al. |
| 9,820,105 | B2 | 11/2017 | Snyder et al. |
| D804,450 | S | 12/2017 | Speil et al. |
| 9,858,559 | B2 | 1/2018 | Raleigh et al. |
| 9,860,151 | B2 | 1/2018 | Ganichev et al. |
| 9,933,224 | B2 | 2/2018 | Dumitriu et al. |
| 9,923,780 | B2 | 3/2018 | Rao et al. |
| 9,967,906 | B2 | 5/2018 | Verkaik et al. |
| 9,980,220 | B2 | 5/2018 | Snyder et al. |
| 9,985,837 | B2 | 5/2018 | Rao et al. |
| 10,097,404 | B2* | 10/2018 | Yadav .................. H04L 45/306 |
| 2003/0087645 | A1 | 5/2003 | Kim et al. |
| 2003/0116634 | A1 | 6/2003 | Tanaka |
| 2003/0118029 | A1* | 6/2003 | Maher, III ........... H04L 47/2441 370/395.43 |
| 2004/0203572 | A1 | 10/2004 | Aerrabotu et al. |
| 2005/0090225 | A1 | 4/2005 | Muehleisen et al. |
| 2005/0169193 | A1 | 8/2005 | Black et al. |
| 2005/0186904 | A1 | 8/2005 | Kowalski et al. |
| 2005/0249199 | A1 | 11/2005 | Albert et al. |
| 2006/0022815 | A1 | 2/2006 | Fischer et al. |
| 2006/0030290 | A1 | 2/2006 | Rudolf et al. |
| 2006/0092964 | A1 | 5/2006 | Park et al. |
| 2006/0126882 | A1 | 6/2006 | Deng et al. |
| 2006/0187866 | A1 | 8/2006 | Werb et al. |
| 2007/0037605 | A1 | 2/2007 | Logan |
| 2007/0239854 | A1 | 10/2007 | Janakiraman et al. |
| 2008/0037715 | A1 | 2/2008 | Prozeniuk et al. |
| 2008/0084888 | A1 | 4/2008 | Yadav et al. |
| 2008/0101381 | A1 | 5/2008 | Sun et al. |
| 2008/0163207 | A1 | 7/2008 | Reumann et al. |
| 2008/0233969 | A1 | 9/2008 | Mergen |
| 2009/0129389 | A1 | 5/2009 | Halna DeFretay et al. |
| 2009/0203370 | A1 | 8/2009 | Giles et al. |
| 2009/0282048 | A1 | 11/2009 | Ransom et al. |
| 2009/0298511 | A1 | 12/2009 | Paulson |
| 2009/0307485 | A1 | 12/2009 | Weniger et al. |
| 2010/0039280 | A1 | 2/2010 | Holm et al. |
| 2010/0097969 | A1 | 4/2010 | De Kimpe et al. |
| 2011/0058479 | A1* | 3/2011 | Chowdhury .......... H04W 36/22 370/237 |
| 2011/0075557 | A1* | 3/2011 | Chowdhury ............ H04L 12/14 370/235 |
| 2011/0075675 | A1* | 3/2011 | Koodli .................. H04M 15/41 370/401 |
| 2011/0087799 | A1 | 4/2011 | Padhye et al. |
| 2011/0142053 | A1 | 6/2011 | Van Der Merwe et al. |
| 2011/0182295 | A1 | 7/2011 | Singh et al. |
| 2011/0194553 | A1 | 8/2011 | Sahin et al. |
| 2011/0228779 | A1 | 9/2011 | Goergen |
| 2012/0023552 | A1 | 1/2012 | Brown et al. |
| 2012/0054367 | A1 | 3/2012 | Ramakrishnan et al. |
| 2012/0059934 | A1* | 3/2012 | Rafiq .................. H04L 67/1008 709/225 |
| 2012/0088476 | A1 | 4/2012 | Greenfield |
| 2012/0115512 | A1 | 5/2012 | Grainger et al. |
| 2012/0157126 | A1 | 6/2012 | Rekimoto |
| 2012/0166618 | A1* | 6/2012 | Dahod .................... H04L 47/20 709/224 |
| 2012/0167207 | A1 | 6/2012 | Beckley et al. |
| 2012/0182147 | A1 | 7/2012 | Forster |
| 2012/0311127 | A1 | 12/2012 | Kandula et al. |
| 2012/0324035 | A1 | 12/2012 | Cantu et al. |
| 2013/0007237 | A1* | 1/2013 | Mehta .................... H04W 8/082 709/223 |
| 2013/0029685 | A1 | 1/2013 | Moshfeghi |
| 2013/0039391 | A1 | 2/2013 | Skarp |
| 2013/0057435 | A1 | 3/2013 | Kim |
| 2013/0077612 | A1 | 3/2013 | Khorami |
| 2013/0088983 | A1 | 4/2013 | Pragada et al. |
| 2013/0107853 | A1 | 5/2013 | Pettus et al. |
| 2013/0108263 | A1 | 5/2013 | Srinivas et al. |
| 2013/0115916 | A1 | 5/2013 | Herz |
| 2013/0145008 | A1 | 6/2013 | Kannan et al. |
| 2013/0155906 | A1 | 6/2013 | Nachum et al. |
| 2013/0191567 | A1 | 7/2013 | Rofougaran et al. |
| 2013/0201989 | A1 | 8/2013 | Hu et al. |
| 2013/0203445 | A1 | 8/2013 | Grainger et al. |
| 2013/0217332 | A1 | 8/2013 | Altman et al. |
| 2013/0232433 | A1 | 9/2013 | Krajec et al. |
| 2013/0273938 | A1 | 10/2013 | Ng et al. |
| 2013/0297798 | A1 | 11/2013 | Arisoylu et al. |
| 2013/0317944 | A1 | 11/2013 | Huang et al. |
| 2013/0322438 | A1 | 12/2013 | Gospodarek et al. |
| 2013/0343198 | A1 | 12/2013 | Chhabra et al. |
| 2013/0347103 | A1 | 12/2013 | Veteikis et al. |
| 2014/0007089 | A1 | 1/2014 | Bosch et al. |
| 2014/0016926 | A1 | 1/2014 | Soto et al. |
| 2014/0025770 | A1 | 1/2014 | Warfield et al. |
| 2014/0052508 | A1 | 2/2014 | Pandey et al. |
| 2014/0059655 | A1 | 2/2014 | Beckley et al. |
| 2014/0087693 | A1 | 3/2014 | Walby et al. |
| 2014/0105213 | A1 | 4/2014 | A K et al. |
| 2014/0118113 | A1 | 5/2014 | Kaushik et al. |
| 2014/0148196 | A1 | 5/2014 | Bassan-Eskenazi et al. |

(56) References Cited

U.S. PATENT DOCUMENTS

| | | |
|---|---|---|
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341109 A1* | 11/2014 | Cartmell ........... H04W 28/0263 370/328 |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2015/0365845 A1 | 12/2015 | Lonka et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0344641 A1 | 11/2016 | Javidi et al. |
| 2017/0026974 A1 | 1/2017 | Dey et al. |
| 2017/0214551 A1 | 7/2017 | Chan et al. |
| 2017/0373950 A1 | 12/2017 | Szilagyi et al. |
| 2018/0027478 A1 | 1/2018 | Sama |
| 2018/0041934 A1* | 2/2018 | Agarwal ............... H04W 36/02 |
| 2018/0069311 A1 | 3/2018 | Pallas et al. |
| 2018/0084389 A1 | 3/2018 | Snyder et al. |
| 2018/0337849 A1 | 11/2018 | Sharma et al. |

OTHER PUBLICATIONS

Afolabi, Ibrahim, et al., "Network Slicing & Softwarization: A Survey on Principles, Enabling Technologies & Solutions," Mar. 21, 2018, pp. 1-24.

Antonioli, Roberto, et al., "Dual Connectivity for LTE-NR Cellular Networks," Research Gate, Sep. 3-6, 2017, pp. 171-175.

Carter, Steve Sr., "E911 VoIP Essentials For Enterprise Deployments," XO Communications, LLC, 2012, 9 pages.

Chalise, Batu K., et al., "Mimo Relaying for Multiaccess Communication in Cellular Networks," Sensor Array and MultiChannel Signal Processing Workshop, 2008, SAM 2008, 5th IEEE, Jul. 21, 2008, pp. 146-150.

Cisco ASR 5x00 Mobility Management Entity Administration Guide, Version 15.0, Last updated Jun. 13, 2014, Cisco, 1-266.

Cisco Systems, Inc., "Wi-FI Location-Based Services 4.1 Design Guide," May 20, 2008, 206 pages.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Galvan T., Carlos E., et al., "Wifi bluetooth based combined positioning algorithm," International Meeting of Electrical Engineering Research ENIINVIE 2012, Procedia Engineering 35 (2012), pp. 101-108.

Geller, Michael, et al., "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Ji, Philip N., et al., "Demonstration of High-Speed MIMO OFDM Flexible Bandwidth Data Center Network," Optical Society of America, 2012, 2 pages.

Kandula, Srikanth, et al., "Flyways To De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Network Heresy, "NVGRE, VXLAN and What Microsoft is Doing Right," Oct. 3, 2011, 5 pages.

Saraiva de Sousa, Nathan F., et al., "Network Service Orchestration: A Survey," IEEE Communications Surveys & Tutorials, Mar. 23, 2018, pp. 1-30.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Ventre, Pier Luigi, et al., "Performance Evaluation and Tuning of Virtual Infrastructure Managers for (Micro) Virtual Network Functions," ieee.org, Nov. 7-10, 2016, pp. 1-7.

International Search Report and Written Opinion from the International Searching Authority, dated Aug. 29, 2019, 13 pages, for corresponding International Patent Application No. PCT/US2019/037658.

* cited by examiner

SESSION MANAGEMENT IN A FORWARDING PLANE

CROSS-REFERENCE TO RELATED APPLICATION

This application is a continuation of U.S. patent application Ser. No. 17/109,875, filed on Dec. 2, 2022, which in turn, is a continuation of U.S. patent application Ser. No. 16/030,665, filed on Jul. 9, 2018, both of which are expressly incorporated by reference herein in their entirety.

TECHNICAL FIELD

The present technology pertains to offloading traffic flow processing from a session manager, and in particular to offloading traffic flow processing from a session manager to a forwarding plane of a network environment.

BACKGROUND

Traditionally, networks contain a forwarding plane to manage forwarding of packets through the network. Specifically, network products, such as the packet core products, contain a separate forwarding plane that provides basic layer 2 (herein referred to as "L2"-layer 4 (herein referred to as "L4") functionalities and basic subscriber classification for providing these L2-L4 functionalities. However, this forwarding plane has not traditionally been heavily involved in the subscriber processing. Instead, subscriber processing is typically performed in software using a large subsystem called "Session Manager" (SMGR). SMGR is involved in the full lifecycle of a subscriber, from the initial handshaking and call setup, through all data transfers, and call teardown, even when this processing is relatively simple.

Current SMGRs are challenged in finding a balance between performance and functionality. Specifically, current SMGRs are required to process large amounts of information as part of maintaining a session for a subscriber and often suffer from slow response and processing times. This is an ever increasing problem as network capabilities grow, and the amount of data to process and corresponding complexity of processing the data in a session increases. In particular, with the arrival of 5G technology, subscriber traffic rates dramatically increase ultimately demanding higher throughput. Current SMGR technology is insufficient to scale to higher traffic rates. Specifically, current SMGR technology is typically monolithic and single-threaded in its approach. There therefore exists needs for modifying current SMGR technology to increase an amount and a speed at which SMGRs can process subscriber traffic to increase network throughput.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
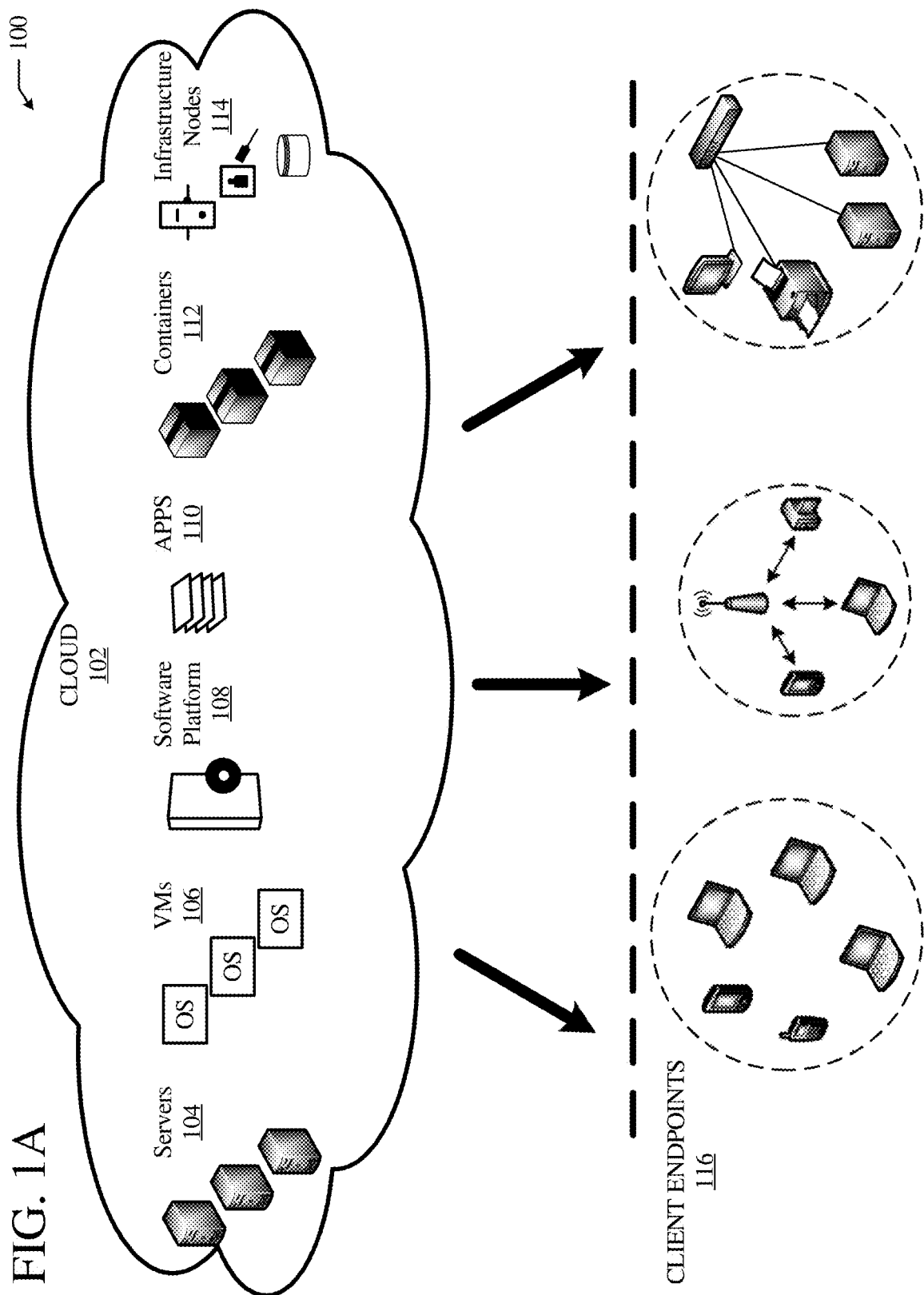
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

A method can include coupling a subscriber to a network endpoint through a session manager during a network session of the subscriber in a network environment. A session manager offloading system of the session manager can be maintained in a forwarding plane of the network environment. The session manager offloading system can be configured to offload processing from the session manager into the forwarding plane. Further, at least a portion of subscriber traffic in a stream between the subscriber and the network endpoint through the session manager can be intercepted. Subsequently, the at least the portion of the subscriber traffic in the stream can be processed at the session manager offloading system as part of offloading the processing from the session manager into the forwarding plane.

A system can couple a subscriber to a network endpoint through a session manager during a network session of the subscriber in a network environment. The system can maintain a session manager offloading system of the session manager in a forwarding plane of the network environment. The session manager offloading system can be configured to offload processing from the session manager into the forwarding plane. Further, the system can intercept at least a portion of subscriber traffic in a stream between the subscriber and the network endpoint through the session manager. The system can then process the at least the portion of the subscriber traffic in the stream based on a context of the stream at the session manager offloading system as part of offloading the processing from the session manager into the forwarding plane.

A system can couple a subscriber to a network endpoint through a session manager during a network session of the subscriber in a network environment. The system can maintain a session manager offloading system of the session manager in a vector packet processing system in a forwarding plane of the network environment. The session manager offloading system can be configured to offload processing from the session manager into the forwarding plane. Further, the system can intercept at least a portion of subscriber traffic in a stream between the subscriber and the network endpoint through the session manager. The system can then process the at least the portion of the subscriber traffic in the stream at the session manager offloading system as part of offloading the processing from the session manager into the forwarding plane.

DESCRIPTION

The disclosed technology addresses the need in the art for improving session manager speed and performance in managing subscriber sessions in a network environment. The present technology involves system, methods, and computer-readable media for offloading processing from a session manager into a forwarding plane of a network environment.

Figure 7:
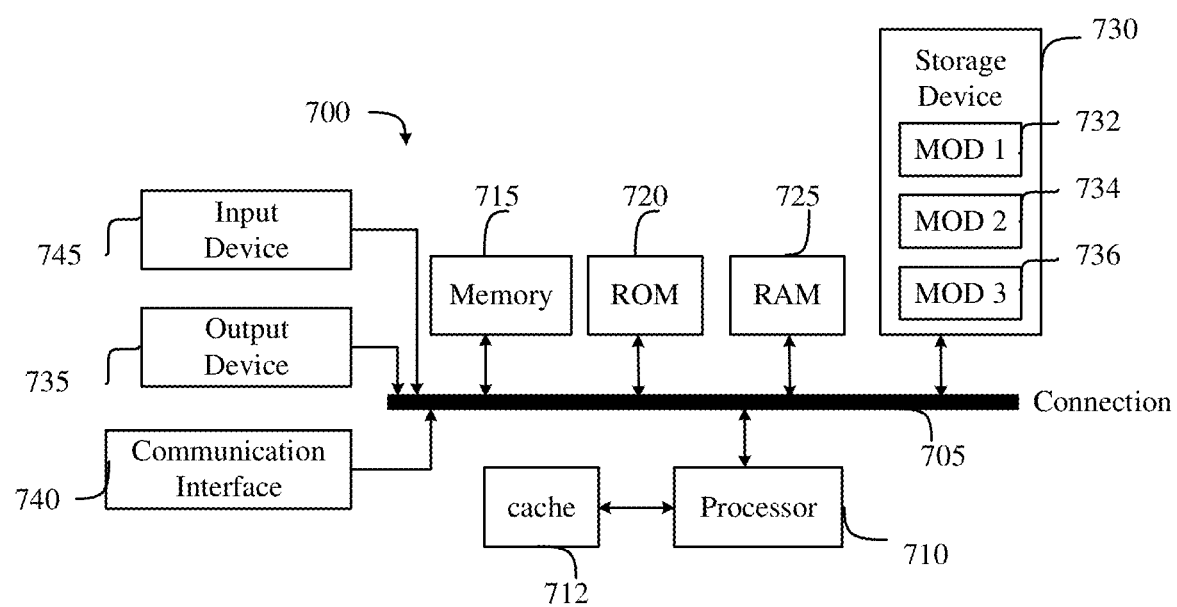
FIG. 7 illustrates an example computing system.
Figure 8:
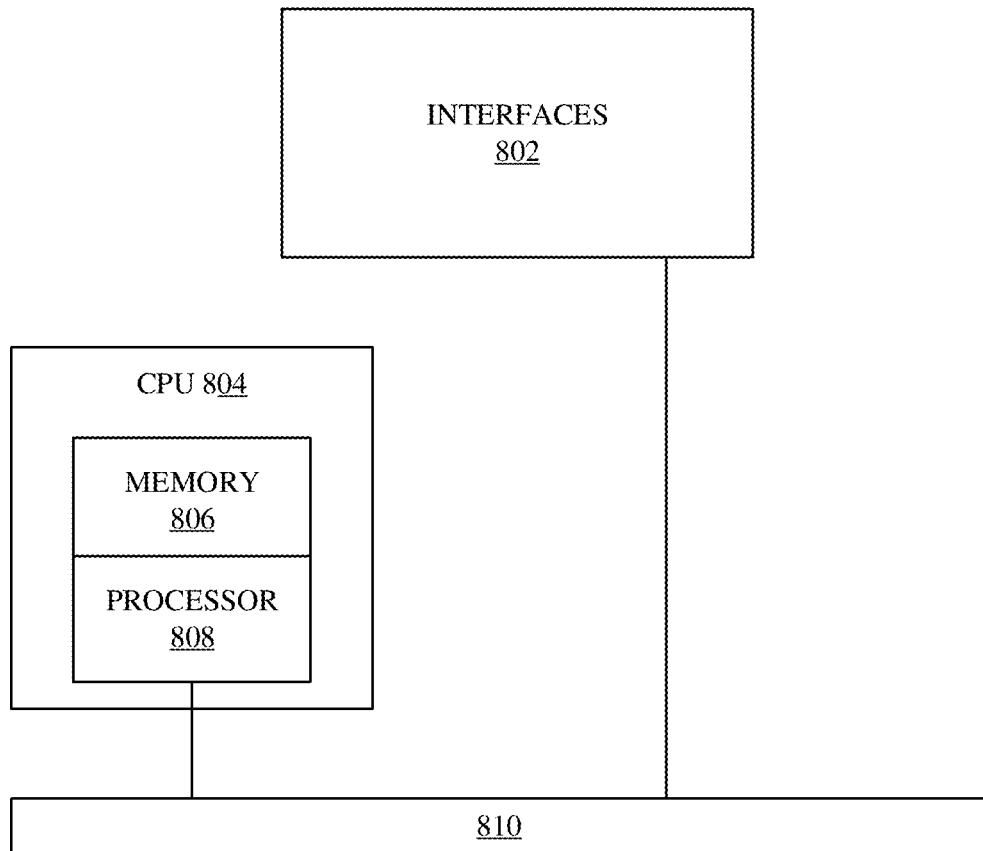
FIG. 8 illustrates an example network device.

A description of network environments and architectures for network data access and services, as illustrated in FIGS. 1A, 1B, 2A, 2B is first disclosed herein. A discussion of systems and methods for offloading processing from a session manager to a forwarding plane of a network environment, as shown in FIGS. 3, 4, 5, and 6, will then follow. The discussion then concludes with a brief description of example devices, as illustrated in FIGS. 7 and 8. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can be part of a network environment and include a forwarding plane, e.g. at routers forming part of the cloud 102. A forwarding plane implemented in the cloud 102 and other forwarding planes described herein can be used to forward data packets as part of sessions with a subscriber. Specifically, forwarding planes can be used to receive and transmit data as part of flows for subscribers as subscribers access network services through a network environment, e.g. using the cloud 102. Further, forwarding planes can include a vector packet processing (herein referred to as "VPP") system that can be used to manage actual data transmission through the forwarding planes. Additionally, the VPP system can carry out all functions performed in a forwarding plane, e.g. functions performed by a data plane, as part of implementing the forwarding plane.

The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
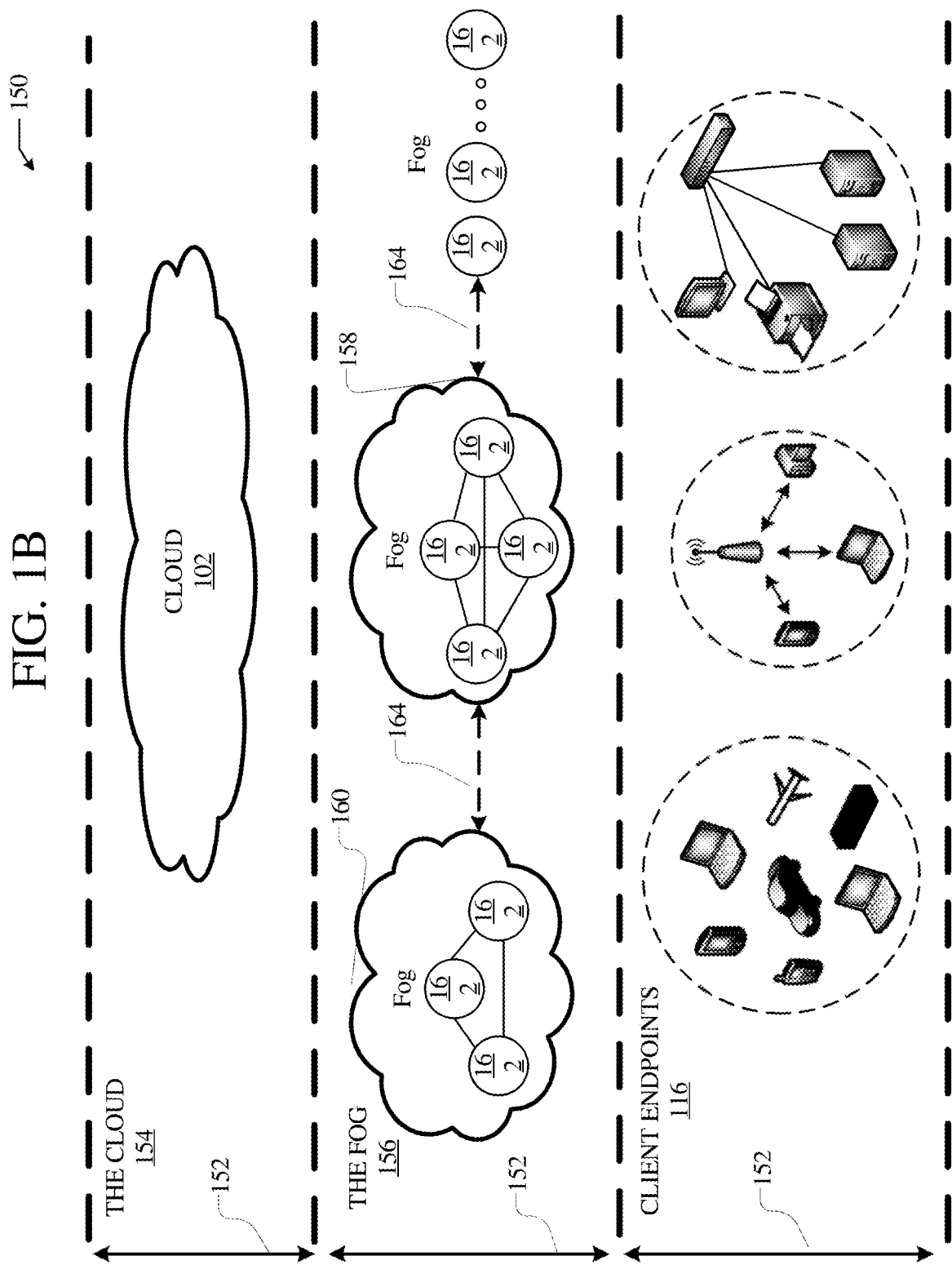
FIG. 1B illustrates an example fog computing architecture.

FIG. 1B illustrates a diagram of an example fog computing architecture 150. The fog computing architecture can be used to provide network service access to subscribers during sessions with the subscribers. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
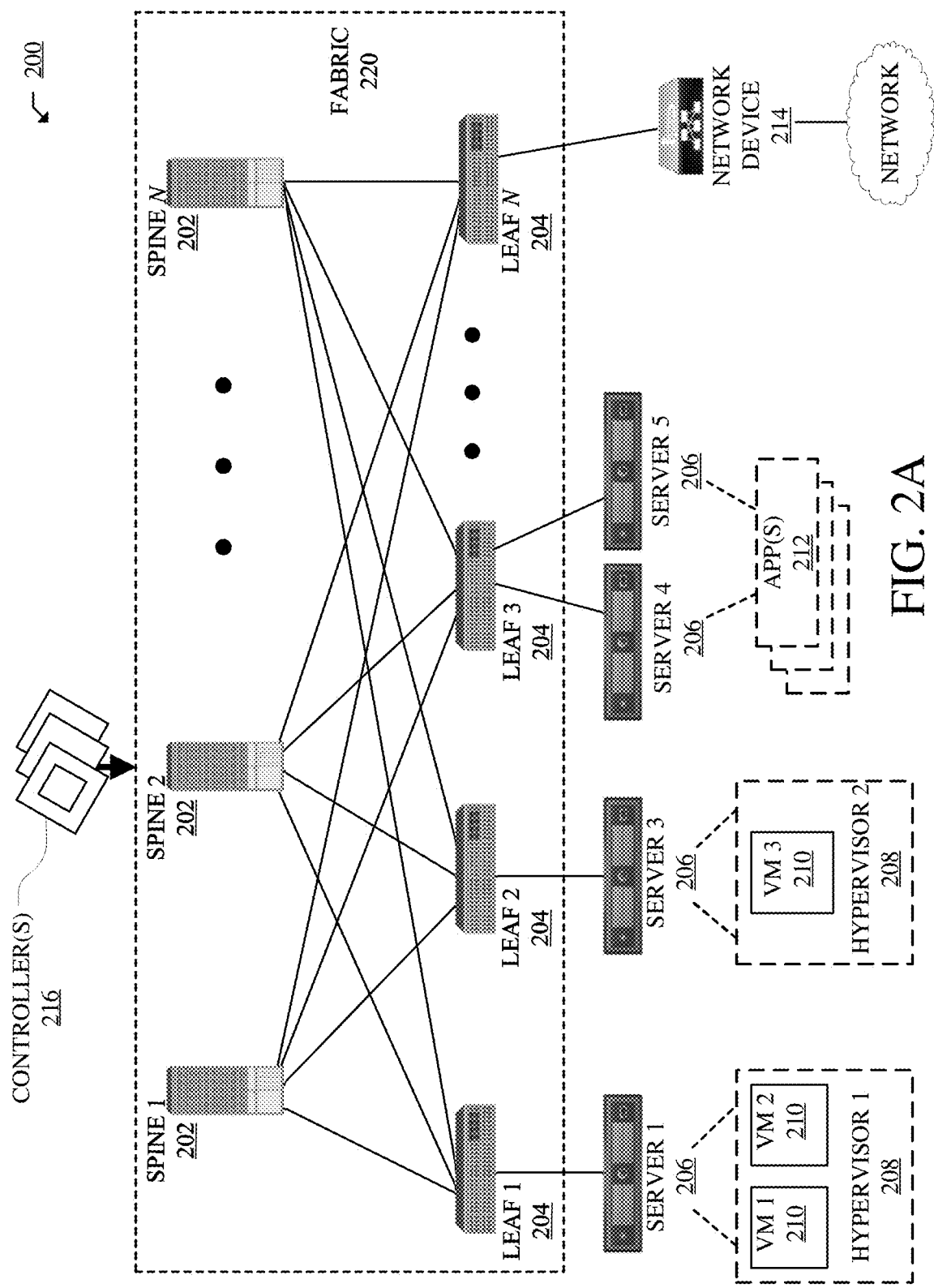
FIG. 2A illustrates a diagram of an example network environment, such as a data center.

FIG. 2A illustrates a diagram of an example Network Environment 200, such as a data center. The Network Environment 200 can be used provide network service access to subscribers as part of sessions with the subscribers. Specifically, the Network Environment 200 can include a forwarding plane that is used to transmit data to and from a subscriber during a session as part of providing the subscriber network service access. For example, the forwarding plane can include a logical construct implemented at routers and switches in the network environment 200.

In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200. For example, a server connected to a specific leaf can be changed to connect to a different or additional leaf Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
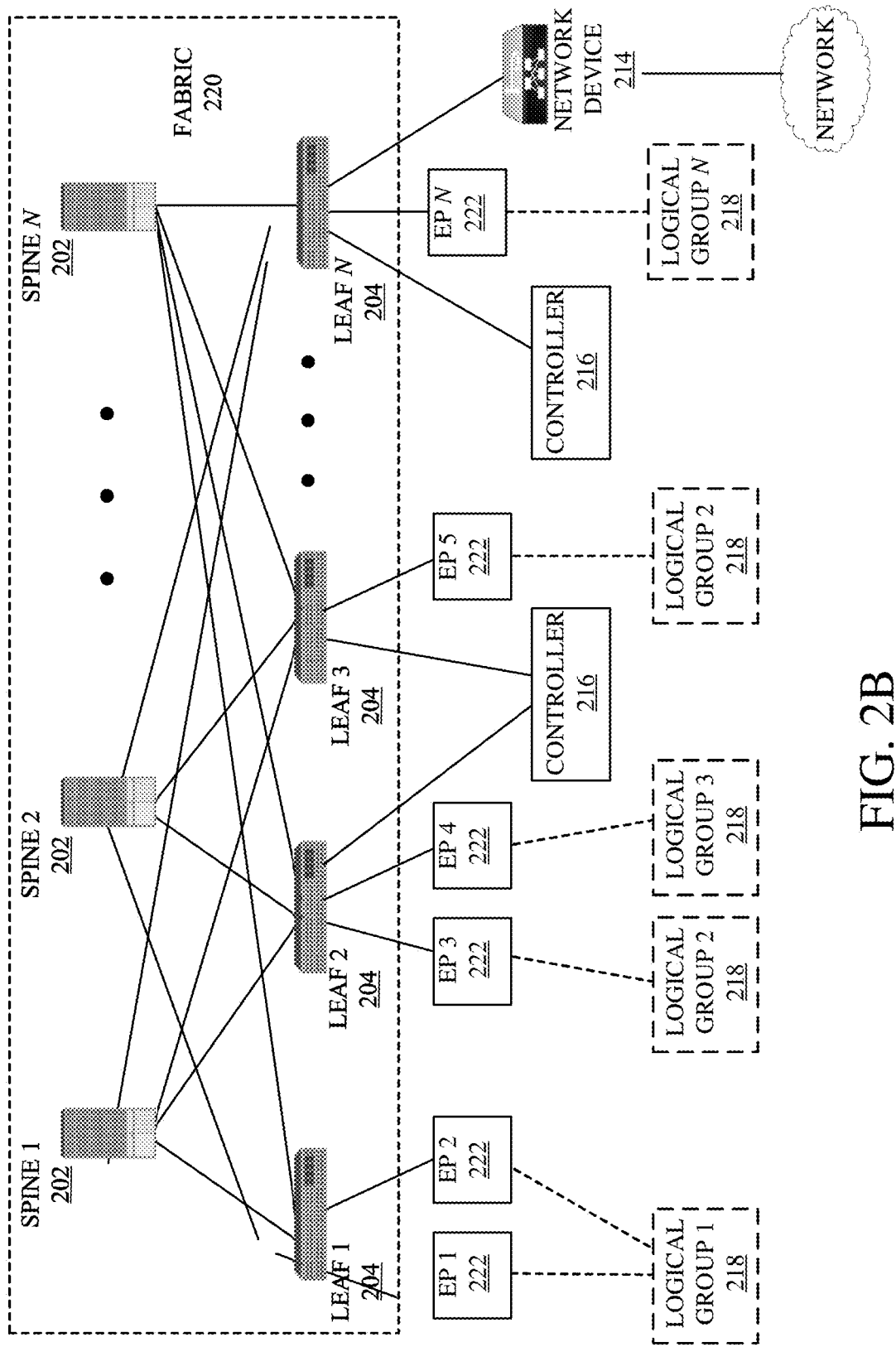
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Traditionally, networks contain a forwarding plane to manage forwarding of packets through the network. Specifically, network products, such as the packet core products, e.g. implemented at routers and/or switches, contain a separate forwarding plane that provides basic L2-L4 functionalities and basic subscriber classification. However, this forwarding plane has not traditionally been heavily involved in the subscriber processing. Instead, subscriber processing is typically performed in software using a large subsystem called "Session Manager" (SMGR). SMGR is involved in the full lifecycle of a subscriber, from the initial handshaking and call setup, through all data transfers, and call teardown, even when this processing is relatively simple.

Current SMGRs are challenged in finding a balance between performance and functionality. Specifically, current SMGRs are required to process large amounts of information as part of maintaining a session for a subscriber and often suffer from slow response and processing times. This is an ever increasing problem as network capabilities grow, and the amount of data to process and corresponding complexity of processing the data in a session increases. In particular, with the arrival of 5G technology, subscriber traffic rates dramatically increase ultimately demanding higher throughput. Current SMGR technology is insufficient to scale to higher traffic rates. Specifically, current SMGR technology is typically monolithic and single-threaded in its approach. There therefore exists needs for modifying current SMGR technology to increase an amount and a speed at which SMGRs can process subscriber traffic to increase network throughput.

The present includes systems and methods for offloading processing from a session manager. Specifically, the present includes systems and methods for offloading processing from a session manager to a session manager offloading system maintained in a forwarding plane of a network environment. A subscriber can be coupled to a session manager during a network session of the subscriber. The session manager offloading system in the forwarding plane can intercept at least a portion of subscriber traffic in a stream from the subscriber to the session manager. Subsequently, the session manager offloading system can process the at least the portion of the subscriber traffic in the stream to offload processing from the session manager. This can free up session manager resources, e.g. CPU processing power and memory, to concurrently process different subscriber data, e.g. data for another subscriber or more complex subscriber data for the subscriber. By working together, the session manager and the session manager offloading system can increase the amount of subscriber data that is capable of being processed and increase the speed at which this subscriber data is processed, effectively increasing throughput in the network. This is increasingly important as demands for greater network throughput increase, e.g. as required by 5G technology.

Figure 3:
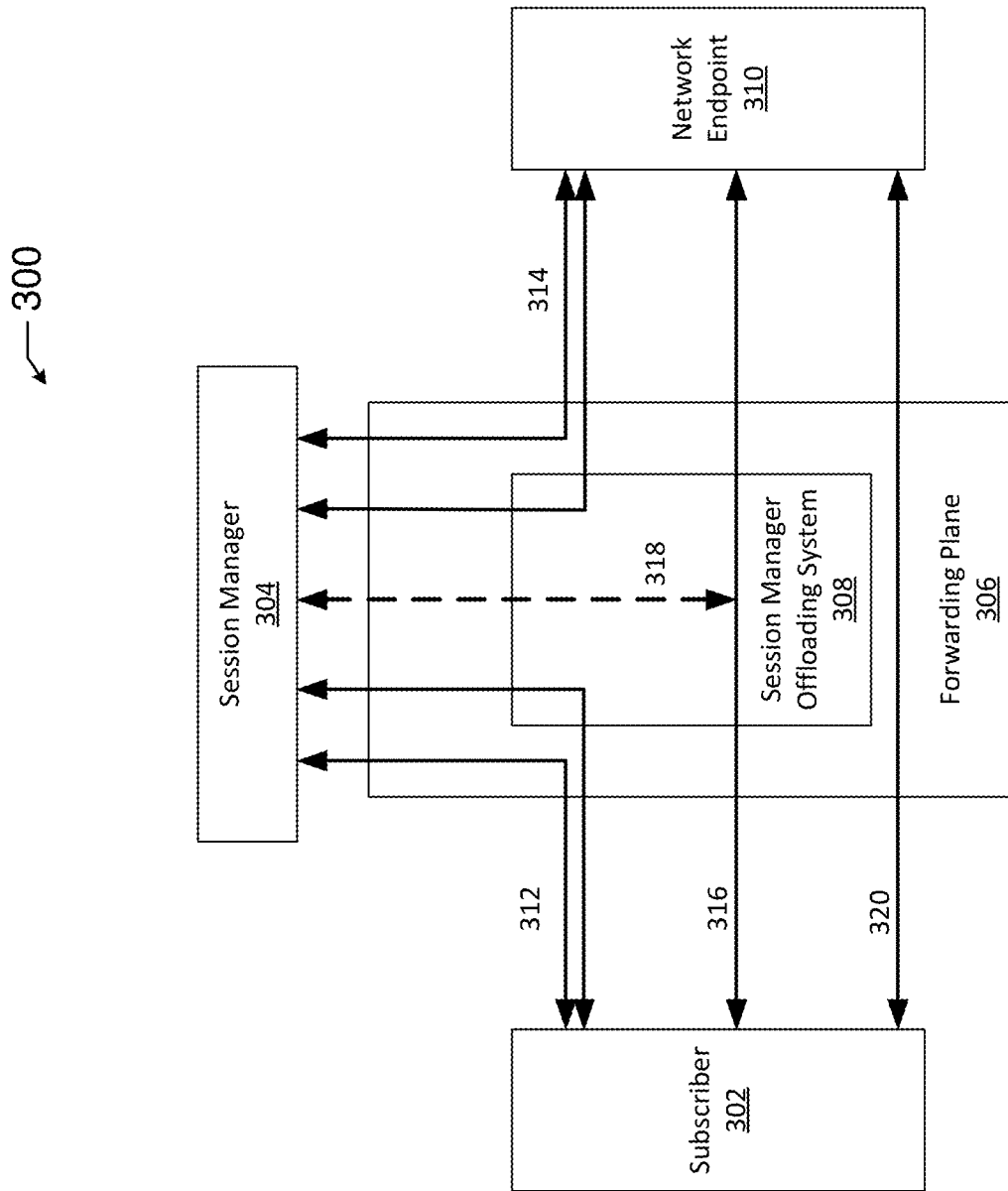
FIG. 3 illustrates an example environment for offloading processing from a session manager in providing network service access to a subscriber during a session.

FIG. 3 illustrates an example environment 300 for offloading processing from a session manager in providing network service access to a subscriber during a session. The environment 300 includes a subscriber 302, a session manager 304, and a network endpoint 310. The session manager 304 can function according to a typical session manager that manages an entire life cycle of the subscriber 302 in accessing network services through a network environment. Specifically, the session manager 304 can manage transmission and receipt of data for the subscriber 302 as part of a session. More specifically, the session manager 304 can manage transmission and receipt of data for the subscriber 302 as part of the subscriber 302 accessing network services through a flow. For example, the session manager 304 can manage an initial handshake, a call setup, all data transfers, and call teardown during a session/flow for the subscriber 302. The session manager 304 can be implemented as part of an applicable network environment, e.g. on a switch or router, for providing network service access, such as the cloud computing and fog architectures shown in FIGS. 1A and 1B and the example network environments shown in FIGS. 2A and 2B.

The session manager 304 can manage transmission of subscriber data as part of a flow between the subscriber 302 and a network endpoint 310. Specifically, the session manager 304 can manage both ingress and egress traffic in a flow between the subscriber 302 and the network endpoint 310. As will be discussed in greater detail later, whether traffic is ingress or egress traffic is specific to a direction of the traffic with respect to a reference point, e.g. the subscriber 302 or the network endpoint 310. For example, traffic originating at the subscriber 302 and destined for the network endpoint 310, upstream traffic, is ingress traffic with respect to the network endpoint 310 and egress traffic with respect to the subscriber 302. Vice versa, traffic originating at the network endpoint 310 and destined for the subscriber 302, downstream traffic, is ingress traffic with respect to the subscriber 302 and egress traffic with respect to the network endpoint 310.

The example environment 300 shown in FIG. 3 includes a forwarding plane 306, e.g. implemented on a switch or router in the environment 300. The forwarding plane 306 is configured to control transmission of data between the subscriber 302 and the session manager 304 as part of a session. Specifically, the forwarding plane 306 can function according to an applicable plane for controlling flows of data packets that arrive at inbound interfaces between the subscriber 302 and the network endpoint 310 through the session manager 304 in one or more streams of a session. More specifically, the forwarding plane can be configured to refer to a table to identify destination addresses of incoming packets and determine a path to a corresponding receiving element through a fabric in a network environment. For example, the forwarding plane 306 can provide basic L2-L4 routing functionalities and basic subscriber classification in a flow for the subscriber 302 and the network endpoint 310 for flows between the subscriber 302 and the network endpoint 310.

A flow/stream can include data transmitted between the subscriber 302 and the network endpoint 310 through the session manager 304 during a specific session or part of a specific session. The network endpoint 310 can include an applicable destination for providing network service access to the subscriber 302. For example, the network endpoint 310 can be a server. Alternatively, the network endpoint 310 can be another subscriber in a network environment. Data transmitted in a flow/stream can be referred to as subscriber traffic. Subscriber traffic can include either or both data that originates at the subscriber 302 and is destined for the network endpoint 310, and data that is destined for the subscriber 302 from the network endpoint 310.

In the example environment 300 shown in FIG. 3, the forwarding plane 306 includes a session manager offloading system 308. The session manager offloading system 308 functions to offload processing from the session manager 304. Specifically, the session manager offloading system 308 can perform all or a subset of functions performed by the session manager 304 in managing network service access of the subscriber 302 in a flow. For example, the session manager offloading system 308 can manage data transfers during a flow of the subscriber 302 in accessing network services. In another example, the session manager offloading system 308 can manage call tear down during a session with the subscriber 302. In offloading processing from the session manager 304 the session manager offloading system 308 can reduce a burden on the session manager 304 in managing and processing traffic in sessions for subscribers. Specifically, the session manager offloading system 308 can reduce the amount of computational resources the session manager 304 has to expend in managing sessions for subscribers.

The session manager offloading system 308 and the session manager 304 can operate concurrently in processing data for subscribers in session. Specifically, the session manager 304 can concurrently process different subscriber data, e.g. data for another subscriber or more complex subscriber data for the subscriber 302 as the session manager offloading system 308 also processes subscriber data. By working together, the session manager 304 and the session manager offloading system 308 can increase the amount of subscriber data that is capable of being processed. In turn, this can increase the speed at which this subscriber data is processed, effectively increasing throughput in a network environment. This is increasingly important as demands for greater network throughput increase, e.g. as required by 5G technology.

The session manager offloading system 308 can be implemented in an applicable system in the forwarding plane 306. Specifically, the session manager offloading system 308 can be implemented in a VPP system in the forwarding plane 306. A VPP system is a packet processing framework that can process packets using a packet processing graph. Specifically, graph nodes can be added to form a packet processing graph. Accordingly, the graph nodes can be applied to packets on a node-by-node basis to process the packets using the packet processing graph. A VPP system can process packets using vector processing instead of scalar processing. Specifically, a VPP system can process more than one packet at a time as part of a vector of packets, e.g. using a packet processing graph, as opposed to scalar processing based systems that process packets one at a time. This can increase the speed at which packets are processed. Specifically, issues related to stack depth/D-cache misses on stack addresses can be fixed or otherwise reduced.

In offloading processing from the session manager 304, the session manager offloading system 308 can intercept and process at least a portion of data in a stream of the subscriber 302. The session manager offloading system 308 can perform applicable functions of the session manager 304 in processing intercepted data/subscriber data. Specifically, the session manager offloading system 308 can perform discrete operations on data packets of intercepted data from the subscriber 302 to the session manager 304. Further, the session manager offloading system 308 can perform functions according to an instruction from another party acting as a proxy. Specifically, another party acting as a proxy can perform the functions described herein to act as the session manager 304. Specifically, the another party can control the session manager offloading system 308 to offload functions performed by the another party in acting to control session of subscribers.

An operation, as used herein, is a discrete (atomic) block of logic that can be executed on a packet in a stream. For example, the session manager offloading system 308 can perform policing or header transformation on data packets of intercepted data from the subscriber 302. In another example, operations performed by the session manager 304 can include increment counting, increment counting with conditional behaviors based on a set of thresholds, token bucket policing, stripping bytes from a packet, encapsulating network headers, logging an entry for a packet in a buffer, e.g. for debugging purposes, sending the packet to a particular destination, header validation as part of monitoring packet/time relationships, detecting out of order packets, connecting to a third party application acting as an operation plugin for performing operations, and packet replication for a multicast/broadcast operation, e.g. for packet intercept or port monitoring. Further operations can form building blocks for other more complex operations. Specifically, complex operations can be carried out on a data packet by performing the less complex/building block operations that form the complex operations. In turn, this can encourage operation re-use for increased feature velocity and instruction cache efficiency, e.g. reduced storage as complex operations do not need to be completely stored.

The session manager offloading system 308 can intercept and process portions of data based on a context of a stream. A context of a stream can include applicable characteristics of a stream of data, e.g. as it relates to providing network service access to the subscriber. For example, a context of a stream can include one or a combination of characteristics of state-related content of the stream, an origination point of data in the stream, a destination of data in the stream, timestamps, counters, applicable content required to process packets of a stream, and a complexity of a stream, e.g. an amount of computational resources or processing power required to process the entire stream or a portion of data in the stream.

The session manager 304 can determine whether to process all, a portion of a stream, or none of a stream at the session manager offloading system 308. Specifically, the session manager 304 can determine whether to process a stream based on a context of the stream. More specifically, the session manager 304 can determine whether to process a stream based on an amount of computational resources need to process the stream. For example, the session manager 304 can determine to process streams that are less complex, e.g. require less than a threshold amount of processing power, in the session manager offloading system 308. Conversely, the session manager 304 can determined to process streams that are more complex, e.g. require more than a threshold amount of processing power, at the session manager 304. Subsequently, as will be discussed in greater detail later, conduits can be established for streams identified for processing by the session manager offloading system 308 and the streams can be processed using the conduits by the session manager offloading system 308.

Further a context of a stream can also include a state of a stream in being processed or potentially processed by the session manager offloading system 308. A state of a stream can include a drop stream, a passive stream, a configuring stream, and an active stream. A drop stream is a stream where all data packets in the stream are dropped, e.g. by the session manager 304 and/or the session manager offloading system 308. A passive stream is a stream that is not processed by the session manager offloading system 308 and is instead processed in its entirety at the session manager 304. Specifically, all data packets in a passive stream are transmitted to the session manager 304 and processed at the session manager 304. A configuring stream is a stream that will be processed at least in part by the session manager offloading system 308, however the session manager offloading system 308 is still being configured to process the stream. Specifically, as will be discussed in greater detail later, a configuring stream can be a stream where a conduit for processing the stream in the session manager offloading system 308 is still being established. An active stream is a stream that is actually being processed either in part or in its entirety by the session manager 304. Specifically, all packets in an active stream can be processed in a conduit by the session manager offloading system 308.

A state of a stream can switch between one of the previously described stream states. Specifically, a stream can switch from a passive state, e.g. a passive stream, to an active state, e.g. an active stream based on an occurrence of a specific event as part of stream processing or conduit operation. For example, a stream can switch from an active to a passive state if a counter threshold is exceeded. Further, a stream can switch from a non-passive state, e.g. active stream or configuring state, to a passive state based on an occurrence of a specific event as part of stream processing or conduit operation. For example, a stream can switch from an active stream to a passive stream if the stream is idle, e.g. no traffic has arrived for the stream for a configurable period of time.

The session manager offloading system 308 can determine whether to process all or a portion of a stream at the session manager offloading system 308. Specifically, the session manager offloading system 308 can determine whether to intercept and process data in a stream. Subsequently, the session manager offloading system 308 can intercept and process the data in the stream if it determines to intercept and process the data. The session manager offloading system 308 can determine whether to process all or a portion of a stream based on a context of the stream. Specifically, the session manager offloading system 308 can determine whether to process all or a portion of a stream based on a state of the stream, as included as part of a context of the stream. For example, if a stream is an active stream, then the session manager offloading system 308 can determine to intercept subscriber traffic in the stream and subsequently process the intercepted subscriber traffic.

The session manager offloading system 308 can maintain stream context data indicating contexts of one or more streams. For example, the session manager offloading system 308 can maintain stream context data for a stream indicating that the stream is an active stream. In another example, stream context data can indicate a holding queue used to store packets of a stream while waiting for guidance from the session manager 304. Context data can be maintained from the start of a stream, e.g. when the stream arrives at either or both the session manager 304 and the session manager offloading system 308, until the end of the stream, e.g. when the stream is destroyed based on instructions from either or both the session manager 304 and the session manager offloading system 308.

The session manager offloading system 308 can maintain stream statistics for streams processed by the session manager offloading system 308. Stream statistics can include applicable statistics related to processing of a stream in the session manager offloading system 308. For example stream statistics can include an amount data in a stream processed by the session manager offloading system 308 and operations performed on the data as part of processing the data. Stream statistics can be pushed to or otherwise exchanged with the session manager 304 from the session manager offloading system 308. Specifically, the session manager offloading system 308 can push or exchange stream statistics to the session manager according to a configurable interval. For example, the session manager offloading system 308 can push or exchange stream statistics to the session manager 304 every 30 seconds.

The session manager offloading system 308 can forward intercepted data packets to a cryptographic processing system. Specifically, the session manager offloading system 308 can forward encrypted data packet to a cryptographic processing system either before or during application of operations to the packets at the session manager offloading system 308. Subsequently, the session manager offloading system 308 can receive decrypted packets from the cryptographic processing system and begin or continue applying operations to the decrypted packets. More specifically, the session manager offloading system 308 can encapsulate a data packet with a header, e.g. a multiplexing extended header, and provide the data packet to an encryption or decryption graph node. Subsequently, the graph node can return the encrypted or decrypted packet back to the session manager offloading system 308 where the packet can be processed.

In processing data in a stream by applying operations to the data, the session manager offloading system 308 can cause a number of different outcomes. Specifically, the session manager offloading system 308 can send data to input for possible reclassification and/or forwarding. Alternatively, the session manager offloading system 308 can forward the data as part of egress traffic. For example, the session manager offloading system 308 can send data to a specific network endpoint, e.g. another subscriber. Further, the session manager offloading system 308 can send data to the session manager 304 for further processing. For example, the session manager offloading system 308 can send data to the session manager 304 if it unable to process the data or otherwise encounters an error while processing the data.

The session manager offloading system 308 can be configured to process streams based on a capacity of the session manager offloading system 308. Specifically, the session manager offloading system 308 can be configured to process streams if its utilization is less than a capacity utilization of the session manager offloading system 308. Specifically, if the session manager offloading system 308 is operating at or greater than its capacity utilization, then the session manager offloading system 308 can refrain from changing states of streams from passive to configuring states, e.g. begin to set up conduits for processing the streams. Further, if the session manager offloading system 308 is operating at or greater than its capacity utilization, then the session manager offloading system 308 can refrain from changes states of streams from passive to active states. Additionally, the session manager offloading system 308 can notify the session manager 304 that the session manager offloading system 308 is operating above its capacity utilization. Capacity utilization and a corresponding capacity threshold can be a function of both the CPU utilization by the session manager offloading system 308 and memory resources of the session manager offloading system 308.

A capacity threshold of the session manager offloading system 308 can be variable. Specifically, a capacity threshold of the session manager offloading system 308 can be a function of a priority of processing specific streams by the session manager offloading system 308. For example, if a priority of stream being processed is high, then the capacity threshold of the session manager offloading system 308 can be greater than a capacity threshold of the session manager offloading system 308 in processing lower priority streams. In turn, this can ensure that higher priority streams are still processed by the session manager offloading system 308 while still ensuring that the session manager offloading system 308 is not consuming large amounts of computational resources.

FIG. 3 illustrates example data flows 312, 314, 316, and 318 as part of processing one or more streams at the session manager offloading system 308. Specifically, at data flow 312, one or more data packets destined for the network endpoint 310 in a stream are initially sent from the subscriber 302 to the session manager 304 through the forwarding plane 306 at data flow 312. Specifically, the session manager 304 can receive the data packets from the subscriber 302 either directly through the forwarding plane 306 or through the session manager offloading system 308 in the forwarding plane 306.

The session manager 304 can receive the data packets and decide whether to offload processing of the stream to the session manager offloading system 308. If the session manager 304 determines that it should process the stream, then the session manager 304 can function normally and process the one or more data packets received in the data flow 312. The one or more packets can then be transmitted by the session manager 304 to the network endpoint 310, at flow 314. The one or more packets can be transmitted by the session manager 304 to the network endpoint 310 through the forwarding plane 306, at flow 314. Specifically, the session manager can transmit the one or more packets to the network endpoint 310 at flow 314 either directly through the forwarding plane 306 or through the session manager offloading system 308 in the forwarding plane 306. The one or more packets can then be processed by the network endpoint 310 and results can be sent back to the subscriber 302 through the forwarding plane 306, e.g. at flow 320, as part of ingress traffic for the subscriber 302. Further, as will be discussed in greater detail later, flows 314 and 312 can be bi-directional, as shown in FIG. 3 and used to send the results back to the subscriber 302.

As discussed previously, whether traffic is egress or ingress traffic depends on an origin and/or a destination of traffic. For example, egress traffic with respect to the subscriber 302 refers to traffic that is sent away from the subscriber 302. Ingress traffic with respect to the subscriber refers to traffic that is destined for the subscriber while originating away from the subscriber, e.g. at the network endpoint 310. Conversely, egress traffic with respect to the network endpoint 310 refers to traffic that is sent away from the network endpoint 310. Ingress traffic with respect to the network endpoint 310 refers to traffic that is destined for the network endpoint 310 while originating away from the network endpoint 310, e.g. at the subscriber 302.

Further, traffic can be ingress and egress respective to one or a combination of the session manager 304, the forwarding plane 306, and the session manager offloading system 308. Specifically, ingress traffic with respect to the session manager offloading system 308 can include traffic that is sent to, e.g. intercepted by, the session manager offloading system 308. Further, egress traffic with respect to the session manager offloading system 308 can include traffic that is sent from the session manager offloading system 308, e.g. as part of processing the traffic at the session manager offloading system 308.

If the session manager determines to offload the processing of the stream to the session manager offloading system 308, then the one or more packets transferred at data flow 312 can be added to a queue. Specifically, the one or more data packets sent at flow 312 can be added to a queue before the session manager offloading system 308 is configured to process the stream, e.g. before a conduit for the stream is set up. Accordingly, the one or more data packets can be added to the queue until the session manager offloading system 308 is configured to process them. After the session manager offloading system 308 is configured to process the stream, the one or more data packets can be transferred from the queue to the session manager offloading system 308. The session manager offloading system 308 can then process the data packets. As part of processing the one or more data packets, the data can be sent by the session manager offloading system 308 to the network endpoint 310, e.g. another subscriber. Specifically, the data can be sent by the session manager offloading system 308 as part of flow 314 that extends through the session manager offloading system 308 in the forwarding plane 306. The data packets can then be processed at the network endpoint 310 and the results can be returned back from the network endpoint 310 to the subscriber 302 and vice versa through the forwarding plane 306, e.g. at data flow 320, as part of ingress traffic of the subscriber 302. Alternatively, the results can be returned back from the network endpoint 310 to the subscriber 302 through flow 314 and flow 312.

A holding queue for storing data packets in a stream, as part of offloading processing of the stream to the session manager offloading system 308, can be maintained by the session manager offloading system 308 or the session manager 304. As discussed previously, the holding queue can hold packets until the session manager offloading system 308 is configured to process the packets in a stream, e.g. while the stream is in a configuring state. Packets can be added to the queue in an order that they are transmitted in the stream. As follows, the packets can be removed, e.g. processed, from the holding queue in the same order in which they are transmitted and until all packets are processed out of the queue, e.g. run-to-completion. This is advantageous as it can allow for simple removal from the queue to a conduit without having to sort packets into different conduits for different corresponding streams from the queue.

At data flow 316, the subscriber 302 sends additional data packets as part of the subscriber traffic flow between the subscriber 302 and the network endpoint 310. The session manager offloading system 308 can intercept the additional data packets, e.g. if it is determined that the stream is offloaded for processing by the session manager offloading system 308. The additional data packets can either be added to a queue or be directly processed at the session manager offloading system 308, e.g. by applying a conduit to the additional data packets. Subsequently, the session manager offloading system 308 can process the additional packets and send the additional packets to the network endpoint 310 through the forwarding plane 308 and potentially without sending the data packets to the session manager 304. Subsequently, the result of processing data in flow 316 at the network endpoint 310 can be sent back to the subscriber 302 through the forwarding plane 306, e.g. as part of ingress traffic with respect to the subscriber 302 at flow 320. Alternatively, the result of processing the additional data packets in flow 316 at the network endpoint 310 can be sent back to the subscriber 302 as part of one or a combination of flow 312, flow 314, and flow 316.

Alternatively, the session manager offloading system 308 can provide the additional data packets to the session manager 304 at data flow 318. Specifically, the session manager offloading system 308 can provide the additional data packets to the session manager 304 at data flow 318 if the session manager offloading system 308 is unable to process the additional data packets. Subsequently, the session manager 304 can process the additional data packets and send the data packets to the network endpoint 310. Specifically, the session manager 304 can either process the additional data packets and transfer the packets directly to the network endpoint 310 through the forwarding plane 306 or through the session manager offloading system 308 implemented in the forwarding plane 306. The network endpoint can then process the additional packets and add a result of processing the additional data packets to the ingress traffic with respect to the subscriber 302, e.g. at data flow 320 through the forwarding plane 306.

While the data flows are described and with reference to traffic originating at the subscriber 302, as shown in FIG. 3, the session manager offloading system 308 and the session manager 304 can process data flows originating at the network endpoint 310 as part of data sent between the endpoint 310 to the subscriber 302. Specifically, flows 312, 314, 316, 318, and 320 can be bi-directional. More specifically, the session manager 304 and the session manager offloading system 308 can process data flows as part of egress traffic with respect to the network endpoint 310.

Figure 4:
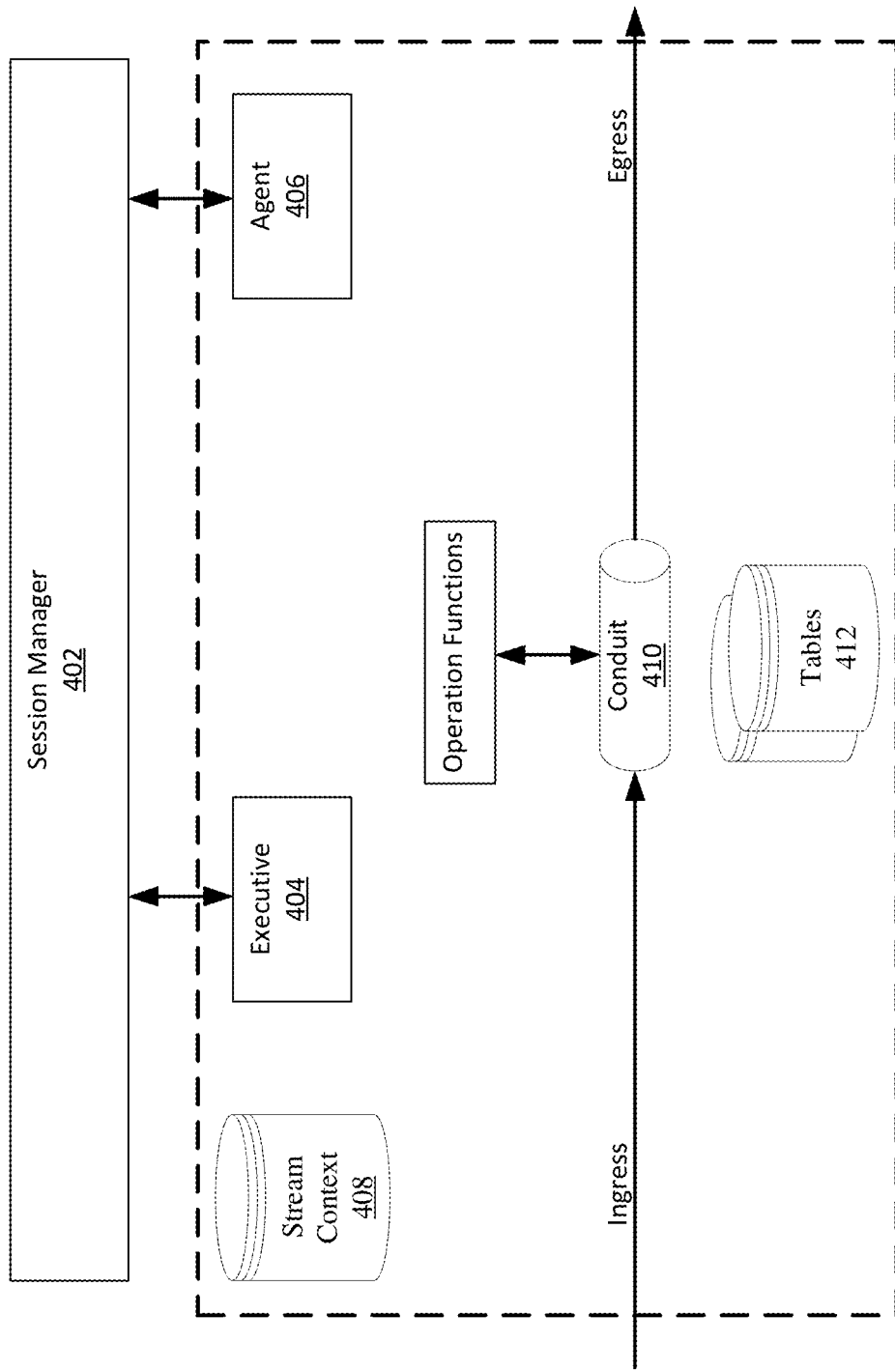
FIG. 4 depicts an example of another system for offloading processing from a session manager.

FIG. 4 depicts an example of another system 400 for offloading processing from a session manager. The system 400 can be implemented as part of a router or a switch in a network environment. The system 400 includes a session manager 402. The session manager 402 can function according to an applicable system for managing a session with a subscriber, such as the session manager 304 described in FIG. 3. The system 400 also includes an executive 404, an agent 406, a stream context datastore 408, a conduit 410, and tables 412. The executive 404, the agent 406, the stream context datastore 408, the conduit 410, and the tables 412 can be integrated as part of an applicable system for offloading processing from the session manager 402, such as the session manager offloading system 308 described in FIG. 3. Further the previously listed elements can be integrated as part of a forwarding plane in a network environment.

The executive 404 can include a body of logic inside of a forwarding plane that is configured to manage processing of streams in the forwarding plane. Specifically, the executive 404 can manage processing of a stream in a forwarding plane based on a context of a stream and a state of the stream included as part of the context of the stream. More specifically, the executive 404 can determine whether to process a stream in the forwarding plane, e.g. based on a context of the stream, and subsequently control processing of the stream in the forwarding plane.

The executive 404 can manage processing of a stream in a forwarding plane using the conduit 410. The conduit 410 can include one or more operations to apply to data in a stream as it is routed through the conduit 410. More specifically, the conduit 410 can include an ordered list of operations to apply in processing data in a stream. The operations to apply through the conduit can be represented in the tables as parameters for the operation functions to apply in processing the data through the conduit 410. It is noted, that while only a single conduit 410 is shown in FIG. 4, in various embodiments, the system 400 can support a number of different conduits for simultaneously processing multiple streams.

Coding/implementation of the executive 404, herein referred to as the executive 404, can determine whether to assign, or otherwise map, one or more operations of the conduit 410 to a specific processing space. In particular, the executive 404 can determine whether to assign one or more operations of the conduit 410, and in turn the conduit 410 itself, to an entire graph node or just a portion of a graph node. In turn the operation can be applied using an entire graph node or a shared graph node based on whether the executive 404 assigns the operation to the entire graph node or the shared graph node.

The executive 404 can assign an operation to an entire graph node or a portion of a graph node based on complexity of the operation. For example, if an operation is more complex, e.g. requires a greater amount of computational resources to complete, then the executive 404 can assign the operation to an entire graph node. For example, the executive 404 can assign an operation of a counter bump in the conduit to a shared graph node. This can solve the problem of scheduling work that is not significant enough to justify a specific processing space, e.g. an entire graph node (i.e. scaling down), while still retaining the power to map more significant operations to graph nodes (i.e. scaling up).

The session manager 402, e.g. an operator using the session manager, can build and manage operations that can be used to form a conduit for processing a stream. Specifically, the session manager 402 through/via the agent 406 can build operations capable of being included in the conduit 410. The agent 406 can build operations capable of being included in the conduit 410 from a basic set of building block operations, e.g. default operations. This allows the session manager 402 to quickly extend a feature set of operations. The agent 406 and the session manager 402 can then work together to build the conduit 410 from the operations. Specifically, the agent 406 can serve as a proxy/api through which the session manager 402 can configure the conduit 410. The agent 406 and the session manager 402 can add operations to the conduit 410 based on characteristics of the stream, e.g. a context of the stream. This allows the agent 406 and the session manager to tailor the conduit 410 to a specific stream based on required operations for processing the specific stream.

The agent 406 can setup and maintain the conduit 410 based on a context of a stream, e.g. as indicated by data in the stream context datastore 408. Specifically, based on a context of a stream, the agent 406 can add operations to the conduit 410 as part of building and maintaining the conduit 410. For example, if a stream is used to access a specific type of data, then agent 406 can add operations to the conduit 410 for accessing the specific type of data. Further, the agent 406 can add operations to the conduit 410 in an order based on a context of a stream to be processed in the conduit 410. The agent 406 can identify a context of the stream by a querying data in the stream context datastore 408.

A stream processed in the conduit 410 can have a designated exception stream. An exception stream is another stream with its own conduit and corresponding operations. The conduit of the exception stream can be executed if the conduit 410 returns an exception return code during processing of the current stream. Whether to have a corresponding exception stream and use the exception stream when an exception return code is encountered can be decided by the agent 406 as part of the agent 406 setting up and maintaining the conduit 410.

The executive 404 can identify whether a packet in ingress traffic belongs to a specific stream. Specifically, the executive 404 can determine whether a packet in ingress traffic belongs to a specific stream that is or will be processed by the session manager offloading system 308, e.g. an active stream processed in the conduit 410. Subsequently, if the executive 404 determines that a packet in ingress traffic, e.g. with respect to the session manager offloading system 308, belongs to a specific stream for processing by the session manager offloading system 308, then the executive can intercept the packet. After intercepting the packet, the executive 404 can direct the packet to a conduit of the stream for processing of the packet as part of processing the stream.

The executive 404 can use context lookup of a stream to determine if a data packet actually belongs to a specific stream. Specifically, the executive can use N-tuple context lookup of a stream to determine if a data packet actually belongs to a specific stream. N in N-tuple context lookup can represent some set of fields in L2 to layer 7 (herein referred to as "L7") packet headers. In instances where classification requires header fields unavailable due to the effects of IP fragmentation on a received traffic flow, the executive 404 can perform IP reassembly.

Either or both the stream context datastore 408 and the tables 412 can include an indication of a stream identifier for a stream. A stream identifier can uniquely identify a stream of data. Further, a stream identifier of a stream can be used by the executive 404 to identify corresponding streams of received data packets. Specifically, an identifier of a stream can be generated using N-tuple context lookup by the executive 404 and subsequently be used to identify a corresponding stream of a packet. More specifically, the context datastore 408 can store either or both a stream hash IPv4 table and a stream hash IPv6. These hash tables can be configured by the agent 406 to include an N-tuple hash key capable of being used with a hash result, including the stream identifier, to identify a stream of a packet. Specifically, the N-tuple hash key can be compared to an N-tuple hash key created by the executive 404, e.g. created following IP reassembly, to determine whether a packet belongs to a specific stream. The executive 404 can then direct the packet to a corresponding conduit of a stream of the packet.

The agent 406 can assign a stream ID to a stream for purposes of processing the stream in the session manager offloading system 308. Specifically, the agent 406 can assign a stream ID from a pool of streams IDs. A pool of stream IDs can be stored in a stream context (pool) datastore. A pool of stream IDs can include a bitmap indicating whether a stream ID is free or is being used. Based on whether a stream ID is free or is being used, the agent 406 can assign the stream ID to a stream for purposes of processing the stream in the session manager offloading system 308.

If the agent 406 identifies that a stream ID does not exist for a specific stream, then the agent 406 can assign a stream ID to the stream. Specifically, the agent 406 can assign a stream ID to the stream from pool of stream IDs based on whether the stream ID is free or is being used. The executive 404 can then control processing of the stream at the session manager offloading system 308, based on the stream ID assigned to the stream. Specifically, the stream ID can be used to initialize a context for the stream, e.g. as indicated by data stored in the stream context datastore 408. More specifically, the stream ID can point to the context for the stream in the stream context datastore 408. More specifically, a hash entry for the stream which is stored in a stream hash IPv4 table or a stream hash IPv6 table. The hash entry can then be used for processing data packets to determine whether the data packets belong to the stream.

After the executive 404 intercepts and directs packets to the conduit 410, e.g. based on the packets belonging to a stream of the conduit 410, the packets can be processed in the conduit 410. Specifically, operations included in the conduit 410 can be applied to the packets. Further, operations included in the conduit 410 can be applied to the packets in the order that the operations are arranged in the conduit e.g. in a list. The list can be exhausted in applying all of the operations to the data, or only partially exhausted based on whether an exception or other event occurs that redirects processing away from the conduit 410. Operation execution within the conduit 410 is tightly curated using optimized code. Specifically, the operations can be executed while avoiding function pointers, thereby preventing inlining.

Every operation in the conduit 410 can have corresponding data in the tables 412, e.g. as pre-processing or post-processing data for the operations. Specifically, each operation in the conduit 410 can include an address, which is a reference to a row or row/column in the tables. Further, each operation in the conduit 410 can have corresponding consumable data in the tables 412, e.g. 64 bits worth of consumable data. Data stored in the tables 412 can include applicable information describing processing of data through operations in the conduit 410. For example, data stored in the tables 412 can include statistics, counters, token bucket policers, and other applicable information that is used or generated while processing data in the conduit 410 through application of operations.

The tables 412 can be sized, e.g. a number of rows in the tables can be created, according to various schemes. Specifically, the tables 412 can be sized according to a dynamic unbounded scheme where an unlimited amount of memory is allocated on-demand to the table. Alternatively, the tables 412 can be sized according to a dynamic bounded scheme where a pre-defined limited amount of memory is allocated on-demand to the table. Further, the tables 412 can be size according to a predefined scheme where the table is allocated a specific amount of memory at its creation.

The tables 412 can be global to the session manager 402. Specifically, the tables 412 can exist across different streams being managed by the session manager 402, e.g. either by the session manager 402 or offloaded to the session manager offloading system 308. The tables 412 can be unique to the session manager 402. Specifically, the tables 412 are not shared across different session managers 402 and are only accessible to a corresponding session manager of the tables. Further, each table of the tables 412 can be of a specific type, e.g. based on data stored in the tables 412. For example, a table of the tables 412 can be a stream statistics table if it stores stream statistics for one or more processed streams.

Each table of the tables 412 can be associated with a unique table ID. The table IDs of the corresponding tables 412 can be allocated from a central pool of table IDs. Further, each table ID can be returned to the central pool, e.g. when a table is no longer utilized or maintained. Each table ID can also include one or a combination of a table type of the table, a client ID of a subscriber that a table stores data for, and an absolute ID. The absolute ID can include the previously described table ID assigned to the table, e.g. an index of the table in the session manager 402/session manager offloading system 308.

The tables 412 can also include an identifier of a client type of a subscriber. The client type can be identified and provided to the session manager offloading system 308 by the session manager 402. Each table of the tables 412 can correspond to a specific subscriber, e.g. uniquely include data for a specific subscriber. Accordingly, each table of the tables 412 can include a client type of a corresponding subscriber whose data is stored in each table. The client type can be bounded to a corresponding session manager/application that is used to process subscriber streams of a specific subscriber. This can allow for efficient organization of data stored in the tables 412 as well as quick retrieval of the data stored in the tables 412.

Rows of data in the tables 412 can be associated with operations, e.g. in the conduit 410. Specifically, operations in the conduit 410 can have a list of addresses, e.g. row IDs, table IDs, and column IDs, that point to specific locations of data in the tables 412. Using the row IDs, tables IDs, and column IDs, the operations can read data from corresponding locations in the tables 412 as the operations are applied to data in the conduit 410. Further, using the row IDs, table IDs, and column IDs, the operations or the executive 404 can write data created by applying the operations to the corresponding locations of data of the operations. For example, the executive 404 can write stream statistics generated by applying a specific operation to data into one or more rows associated with the operation.

Further, rows of data in the tables 412 can be pushed to the session manager 402. Specifically, the rows of data can be pushed to the session manager 402 using the agent 406. For example, stream statistics of a specific stream can be pushed to the session manager 402 through the agent 406. Row data in the tables 412 can be pushed from the tables at a configurable interval. For example, row data in the tables 412 can be pushed to the session manager 402 every four minutes.

The agent 406 can include a body of logic inside of a forwarding plane that is configured to respond to requests from the session manager 402. Specifically, the agent 406 can respond to requests from the session manager 402 to add/modify/delete/query streams processed in the forwarding plane. The agent 406 can communicate with the session manager through an application program interface (herein referred to as "API"), e.g. an API for the session manager offloading system 308.

The agent 406 can invoke client callbacks for a client/subscriber. Specifically, when a new or currently operating session manager re-connects, the agent 406 can invoke a callback using a register of the client, e.g. data in the tables 412 associated with a client ID of the client. In turn this allows for modeling of application-specific behaviors when a new application or session manager connects for the client (including registering Table, Row, Stream callbacks, e.g. in tables 412).

The agent 406 can be configured to allocate a locus to a stream being processed in conduits. A locus is used to abstract processing elements into a form where they can be readily applied for processing streams in conduits. A locus can be mapped to a specific CPU core or processing element, e.g. a single worker thread. In turn, every stream that is assigned the same locus can be processed by the same worker thread. Further, as a locus can be assigned to multiple streams, multiple subscribers, multiple session managers, multiple applications, may share the same locus and corresponding worker thread. Alternatively, the agent can assign different streams to different processing elements. As part of processing streams using processing elements, a packet can arrive at any processing element, e.g. worker thread. Subsequently, e.g. using the locus, the packet can be moved to a specific processing element used to process a stream of the packet.

Each processing element can have independent stream context datastores, and other stream related datastores excluding the tables 412. Accordingly, the stream related datastores of a specific processing element can be used to process streams for only the specific processing element. For example, stream context datastores can be used to identify whether a received data packet actually belongs to a stream being processed on the specific processing element.

A combination of an identifier of a locus of a stream and a corresponding stream ID of the stream can form a universal identifier for uniquely identifying the stream as it is processed in the session manager offloading system 308. This universal identifier can be available to the session manager 402 for use by the session manager in receiving data about the processing of the stream. For example, the universal identifier of the stream can be used by the session manager 402 to gather stream statistics of the stream from the session manager offloading system 308. Further, a combination of an explicit identifier of a processing element, e.g. a thread number, processing a stream and a stream ID of the stream can form an internal identifying for uniquely identifying the stream as it is processed in the session manager offloading system 308. This internal identifier can remain hidden from the session manager 402 and be used only by the session manager offloading system 308 to process the stream.

Figure 5:
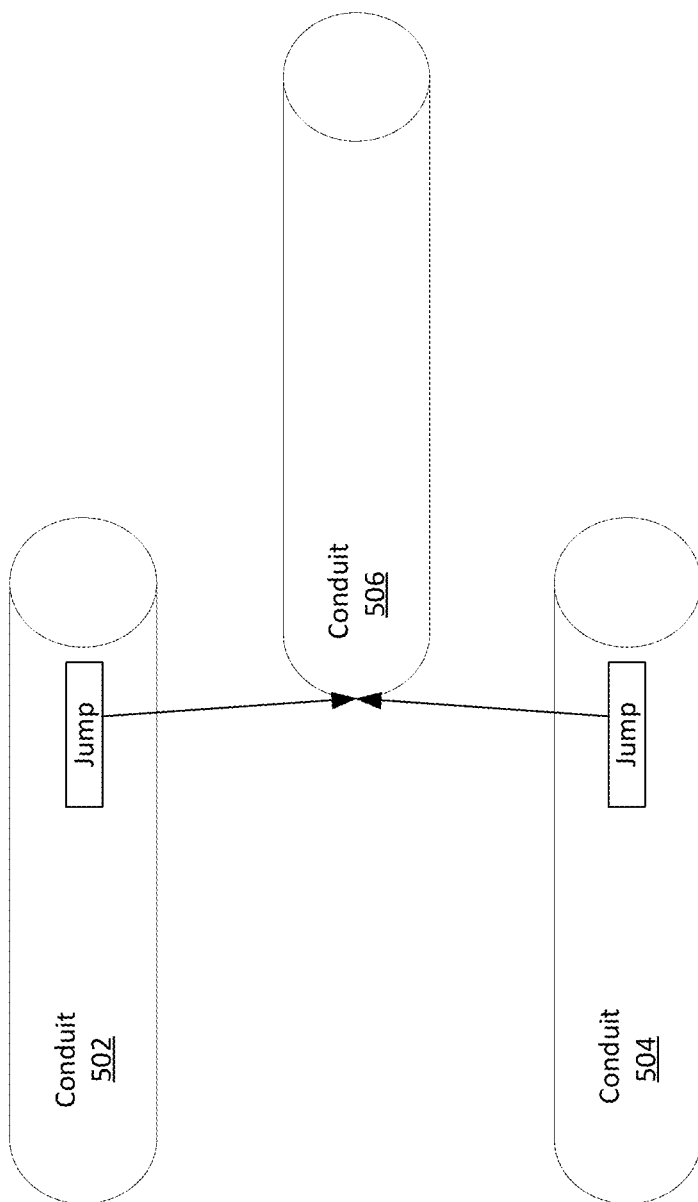
FIG. 5 depicts an environment of chained conduits used to process multiple streams.

FIG. 5 depicts an environment 500 of chained conduits used to process multiple streams. The example environment 500 shown in FIG. 5 can be implemented through an applicable system for offloading processing from a session manager, such as the session manager offloading system 308. Specifically, the example environment 500 shown in FIG. 5 can be implemented in a forwarding plane of a network environment, e.g. through a VPP system.

The example environment shown in FIG. 5 includes a first conduit 502, a second conduit 504, and a third conduit 506. The first conduit 502, the second conduit 504, and the third conduit 506 as discussed previously with respect to the conduit 410 in FIG. 4, can include an ordered list of operations applied to streams for processing data in the streams. The first conduit 502, the second conduit 504, and the third conduit 506 are created for processing specific streams. For example, the first conduit 502 can include a set of specific operations selected and built for processing a first stream. Further in the example, the second conduit 504 can include a different set of specific operations selected and built for processing a second stream. Corresponding operations for the first conduit 502, the second conduit 504, and the third conduit 506 can be selected and built based on a context of a corresponding stream processed in the first conduit 502, a corresponding stream processed in the second conduit 504, and a corresponding stream processed in the third conduit 506.

The first conduit 502 can be chained to the third conduit 506. Specifically, the first conduit 502 can process data in a first stream, and the data can be directed to the third conduit 506 after being processed, at least in part, by the first conduit 502. Subsequently, the data in the first stream can be processed in the third conduit 506. Similarly, the second conduit 504 can be chained to the third conduit 506. Specifically, the second conduit 504 can process data in a second stream, and the data can be directed to the third conduit 506 after being processed, at least in part, by the second conduit 504.

By chaining together conduits, an amount of computational resources and memory resources used in setting up and processing data through conduits in the session manager offloading system 308 can be reduced. Specifically, as specific operations already exist in an already created conduit, the operations do not need to be added to other conduits as part of creating the other conduits for specific streams. Accordingly, an amount of resources used to create the other conduits is reduced, as the conduits do not have to be created to include the operations in the static conduit. In turn, this can further increase the speed at which data can be processed in the session manager offloading system 308.

Figure 6:
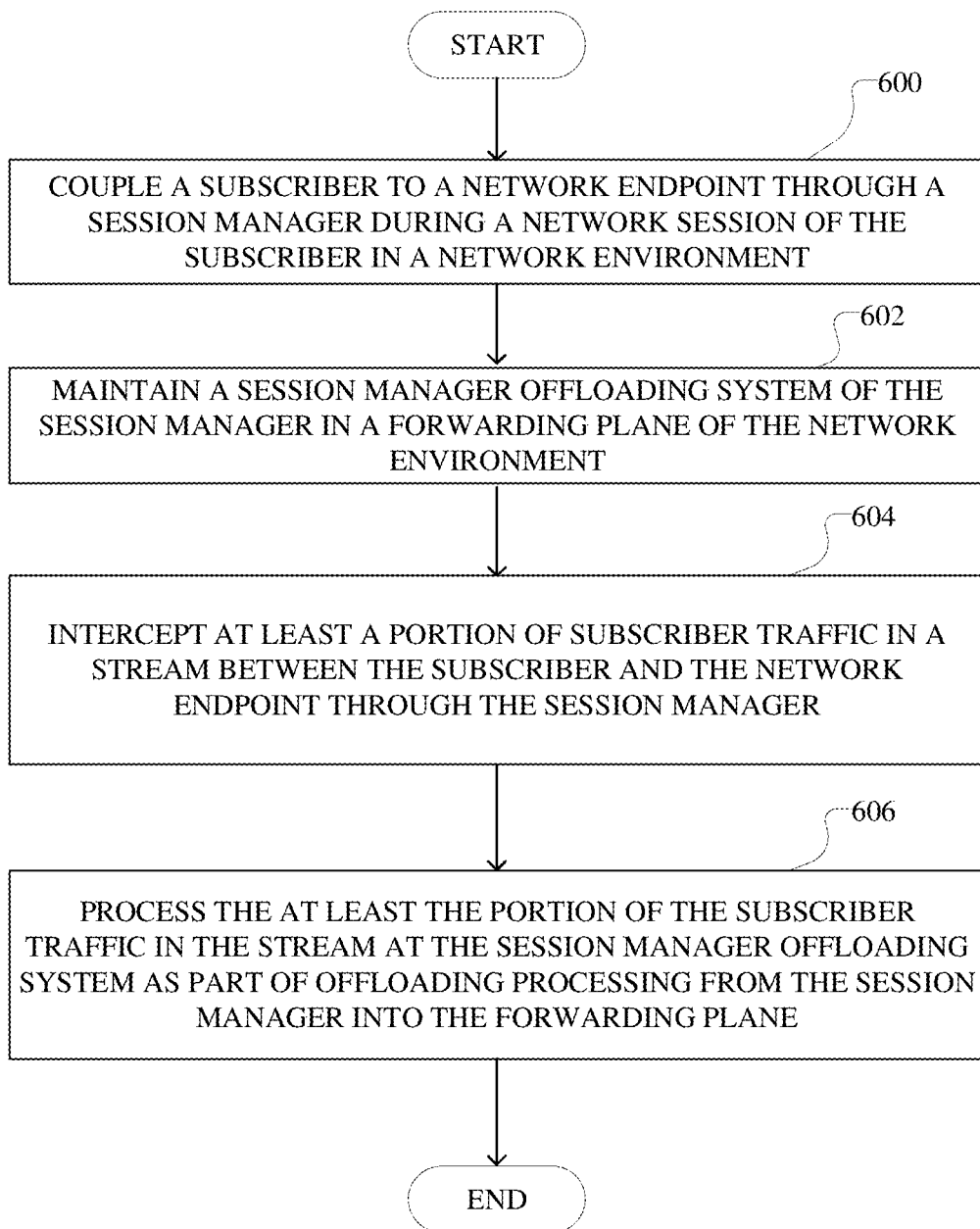
FIG. 6 illustrates a flowchart for an example method of offloading processing from a session manager into a forwarding plane in a network environment.

FIG. 6 illustrates a flowchart for an example method of offloading processing from a session manager into a forwarding plane in a network environment. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated.

Each module shown in FIG. 6 represents one or more steps, processes, methods or routines in the method. For the sake of clarity and explanation purposes, the modules in FIG. 6 are described with reference to the environment 300 and system 400 shown in FIGS. 3 and 4.

At step 600, a subscriber is coupled to a network endpoint through a session manager during a network session of the subscriber in a network environment. The session manager can function according to an applicable session manager for managing, at least in part, a session of the subscriber in accessing network services through the network environment, such as the session manager 304. The subscriber can be coupled to the session manager by sending one or more data packets to the session manager as part of the subscriber accessing or attempting to access network services in the network environment.

At step 602, a session manager offloading system of the session manager is maintained in a forwarding plane of the network environment. The session manager offloading system can function according to an applicable system for offloading processing from a session manager into a forwarding plane, such as the session manager offloading system 308. The session manager offloading system can be maintained in a VPP system.

At step 604, at least a portion of subscriber traffic in a stream between the subscriber and the network endpoint through the session manager is intercepted. Specifically, at least a portion of the subscriber traffic in a stream between the subscriber and the session manager can be intercepted by the session manager offloading system. The session manager offloading system can intercept the at least the portion of the subscriber traffic based on a state of the stream in being processed in the forwarding plane by the session manager offloading system, e.g. a stream context. For example, the session manager offloading system can process the at least the portion of the subscriber traffic if the stream that the traffic belongs to is an active stream or a configuring stream. Further, the session manager offloading can use N-tuple context lookup, e.g. 6-tuple context lookup, for the at least the portion of the subscriber traffic to determine whether the traffic belongs to an active stream or a configuring stream for purposes of determining whether to intercept the traffic.

At step 606, the at least the portion of the subscriber traffic is processed at the session manager offloading system in the forwarding plane as part of offloading processing from the session manager into the forwarding plane. Specifically, the at least the portion of the subscriber traffic can be directed to a conduit that includes an ordered list of operations to apply to data in the stream. Alternatively, the at least the portion of the subscriber traffic can be sent to a holding queue. Specifically, the at least the portion of the subscriber traffic can be directed to a holding queue while a conduit for the stream is setup. Subsequently, the at least the portion of the subscriber traffic can be transferred from the holding queue to the conduit once the conduit is completed for the stream.

The disclosure now turns to FIGS. 7 and 8, which illustrate example network devices and computing devices, such as switches, routers, load balancers, client devices, and so forth.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HS SI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 8 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    intercepting, by at least one network device in a forwarding plane, network traffic between a subscriber and a network endpoint, wherein the network device in the forwarding plane was configured to intercept packets by a network device outside the forwarding plane;
    determining whether to process the network traffic at the at least one network device in the forwarding plane based on at least one of a context of the network traffic or a total amount of network traffic; and
    in response to the determining, processing, by the at least one network device in the forwarding plane, at least a portion of the network traffic between the subscriber and the network endpoint, wherein the network device in the forwarding plane provides an alternative to processing the network traffic by the network device located outside the forwarding plane.

2. The method of claim 1, wherein the at least one network device in the forwarding plane operates in a vector packet processing system in the forwarding plane.

3. The method of claim 1, wherein the at least one network device in the forwarding plane is configured to perform all or a subset of functions performed by the at least one network device outside the forwarding plane.

4. The method of claim 1, further comprising:
    identifying that the network traffic is in a configuring state;
    holding at least a portion of the network traffic in a queue until the network traffic is in an active state for processing by the at least one network device in the forwarding plane; and
    sending at least the portion of the network traffic from the queue to the at least one network device in the forwarding plane for processing by the at least one network device in the forwarding plane.

5. The method of claim 1, further comprising:
   selecting one or more operations to apply to at least a portion of the network traffic at the at least one network device in the forwarding plane; and
   applying the one or more operation to at least the portion of the network traffic as part of processing at the at least one network device in the forwarding plane.

6. The method of claim 1, wherein the at least one network device in the forwarding plane and the at least one network device outside of the forwarding plane process the network traffic concurrently.

7. A network device in a forwarding plane comprising:
   at least one processor; and
   at least one memory storing instructions, which when executed by the at least one processor causes the at least one processor to:
      intercept network traffic between a subscriber and a network endpoint, wherein the network device in the forwarding plane was configured to intercept packets by a network device outside the forwarding plane;
      determine whether to process the network traffic at the at least one network device in the forwarding plane based on at least one of a context of the network traffic or a total amount of network traffic; and
      in response to the determining, process at least a portion of the network traffic between the subscriber and the network endpoint, wherein the network device in the forwarding plane provides an alternative to processing the network traffic by the network device located outside the forwarding plane.

8. The network device of claim 7, wherein the at least one network device in the forwarding plane operates in a vector packet processing system in the forwarding plane.

9. The network device of claim 7, wherein the at least one network device in the forwarding plane is configured to perform all or a subset of functions performed by the at least one network device outside the forwarding plane.

10. The network device of claim 7, further comprising instructions, which when executed by the at least one processor, causes the at least one processor to:
    identify that the network traffic is in a configuring state;
    hold at least a portion of the network traffic in a queue until the network traffic is in an active state for processing by the at least one network device in the forwarding plane; and
    send at least the portion of the network traffic from the queue to the at least one network device in the forwarding plane for processing by the at least one network device in the forwarding plane.

11. The network device of claim 7, further comprising instructions, which when executed by the at least one processor, causes the at least one processor to:
    select one or more operations to apply to at least a portion of the network traffic at the at least one network device in the forwarding plane; and
    apply the one or more operation to at least the portion of the network traffic as part of processing at the at least one network device in the forwarding plane.

12. The network device of claim 7, wherein the at least one network device in the forwarding plane and the at least one network device outside of the forwarding plane process the network traffic concurrently.

13. At least one non-transitory computer readable medium storing instructions, which when executed by at least one processor causes the at least one processor to:
    intercept, by at least one network device in a forwarding plane, network traffic between a subscriber and a network endpoint, wherein the network device in the forwarding plane was configured to intercept packets by a network device outside the forwarding plane;
    determine whether to process the network traffic at the at least one network device in the forwarding plane based on at least one of a context of the network traffic or a total amount of network traffic; and
    in response to the determining, process, by the at least one network device in the forwarding plane at least a portion of the network traffic between the subscriber and the network endpoint, wherein the network device in the forwarding plane provides an alternative to processing the network traffic by the network device located outside the forwarding plane.

14. The at least one non-transitory computer readable medium of claim 13, wherein the at least one network device in the forwarding plane operates in a vector packet processing system in the forwarding plane.

15. The at least one non-transitory computer readable medium of claim 13, wherein the at least one network device in the forwarding plane is configured to perform all or a subset of functions performed by the at least one network device outside the forwarding plane.

16. The at least one non-transitory computer readable medium of claim 13, further comprising instructions, which when executed by the at least one processor, causes the at least one processor to:
    identify that the network traffic is in a configuring state;
    hold at least a portion of the network traffic in a queue until the network traffic is in an active state for processing by the at least one network device in the forwarding plane; and
    send at least the portion of the network traffic from the queue to the at least one network device in the forwarding plane for processing by the at least one network device in the forwarding plane.

17. The at least one non-transitory computer readable medium of claim 13, further comprising instructions, which when executed by the at least one processor, causes the at least one processor to:
    select one or more operations to apply to at least a portion of the network traffic at the at least one network device in the forwarding plane; and
    apply the one or more operation to at least the portion of the network traffic as part of processing at the at least one network device in the forwarding plane.

18. The at least one non-transitory computer readable medium of claim 13, wherein the at least one network device in the forwarding plane and the at least one network device outside of the forwarding plane process the network traffic concurrently.

* * * * *